April 14, 1970 W. D. FAIRRIS ET AL 3,506,256

DATA CARD READER TRANSPORT

Filed Oct. 2, 1967 2 Sheets-Sheet 1

William D. Fairris
Walter S. Richardson
INVENTORS

BY Ransel O. Wyatt
ATTORNEY

DATA CARD READER TRANSPORT

William D. Fairris
Walter S. Richardson
INVENTORS

BY Ranseler O. Wyatt

ATTORNEY

United States Patent Office 3,506,256

Patented Apr. 14, 1970

3,506,256

DATA CARD READER TRANSPORT

William D. Fairris and Walter S. Richardson, Houston, Tex., assignors to Tronics Research & Development Company Filed Oct. 2, 1967, Ser. No. 672,257
Int. Cl. B65h 5/22
U.S. Cl. 271—3 5 Claims

ABSTRACT OF THE DISCLOSURE

A device for moving data cards over a reader head so as to compare each card of a plurality of cards with the indicia of the card being checked, with means for indicating by signal if the card being checked has the identical coded indicia of a card so stored.

SUMMARY OF THE INVENTION

A credit card verifying mechanism having a plurality of punched cards bearing coded indicia of credit cards for which it is no longer desired to extend credit, and means for individually moving said cards over a scanner for comparison of the coded indicia with the coded indicia of a particular credit card, and returning said cards to storage, and having means for signaling the presence of a card having similar indicia to that of the card being examined, and having means for deactivating said card scanning mechanism when the stored cards have been examined.

DESCRIPTION OF THE PREFERRED EMBODIMENT

Figure 1:
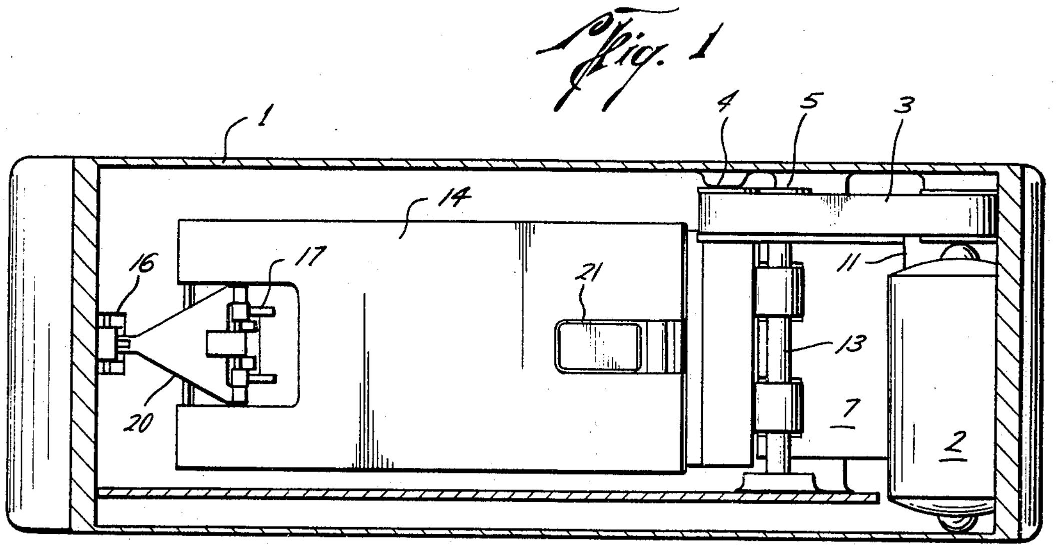
FIGURE 1 is a top plan view of the mechanism with the top removed, taken on the line 1—1 of FIGURE 2.
Figure 2:
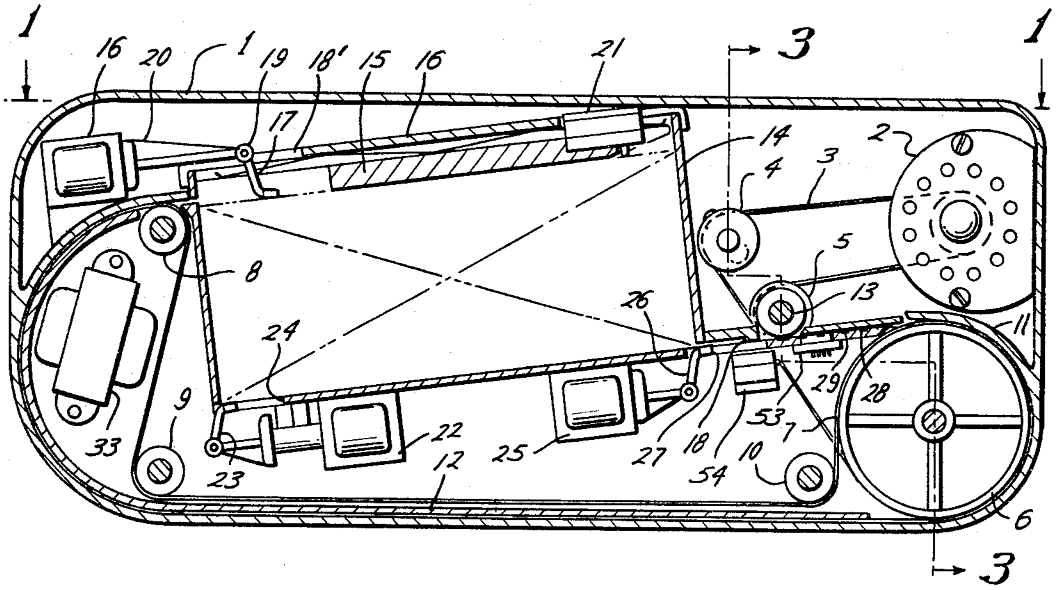
FIGURE 2 is a side elevational view of the device, in longitudinal cross section.

In the drawings the numeral 1 designates a housing in which the motor 2 is mounted which rotates the belt 3 which is mounted on the idler pulley 4 and the card moving roller 5, and on the card belt drum 6. The card belt 7 mounted on the drum 6 and traveling over the rollers 8, 9 and 10, moves in a channel created by the shields 11 and 12. The pulley 5 rotates the card moving roller 13.

A card storage bin 14 is mounted in the housing 1 and is provided with a spring loaded follower 15 beneath the lid 16 and has the forwardly extending guide 17 that terminates with the internal shoulder 18 adjacent the card roller 13.

Cards bearing the coded indicia to be scanned, such as credit card numbers that have been determined to be bad credit risks, are stored in the bin 14 and the follower 15 maintains the cards tightly packed therein. A solenoid 16 is mounted adjacent the top of the bin 14, having the actuating arm 17 extending into the bin through the opening 18' in the lid 15, the arm 17 bearing against the top card in the bin 14, and being hinged as at 19 and spring loaded as 20 so that cards may be passed into the bin during the operation of the device. A micro switch 21 is mounted in the lid at the opposite end of the bin, which activates the solenoid 16 to move a card passed into the bin into fully entered position, the micro switch 21 being activated by the end of a card being passed into the bin by the belt 7.

A solenoid 22 has the spring loaded hinged actuating arm 23 wihch extends through an opening 24 in the bottom of the bin 14 which bears against the bottom card in the bin 14, and when the solenoid 20 is activated, the arm 23 moves the bottom card forwardly until the forward end of the card being moved abuts the shoulder 18. A solonoid 25 has the spring loaded actuating arm 26 which extends through an opening 27 in the bin 14, and which bears against the bottom card in the bin 14.

In vertical alignment with the bottom of the bin 14 is the plate 28, having the yieldable reading pins 29 in operating connection with the electrical conduits extending from the reader 53 and which lead to an electronic decoder (not shown) and a credit card scanner (not shown). Mounted on the plate 28 is the blanking switch 54 designed to deactivate the solenoids 22 and 25 upon signal from the reader 53.

Figure 4:
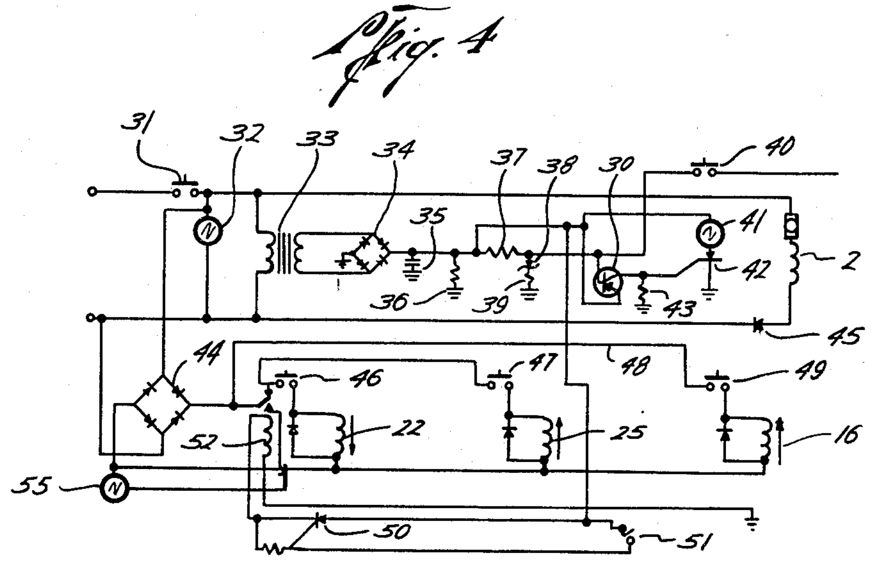
FIGURE 4 is a wiring diagram of the circuits employed.
Figure 3:
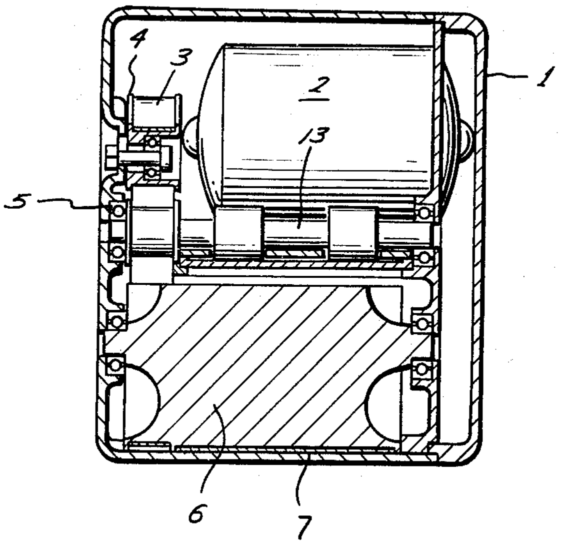
FIGURE 3 is a cross sectional end view taken on the line 3—3 of FIGURE 2.

The circuits employed are shown in FIGURE 4, where the source of supply of energy is through the switch 31, to a signal, such as the amber light 32, which is immediately activated to indicate that the device is on. The circuit is then through the power transformer 33, then through the four way bridge rectifier 34, and the filter 35. A bleeder 36 is provided in the line and then to the current limit resistor 37 and to the Zener regulator 38, and the resistor 39 which is in series to ground with the Zener regulator 38, then to the micro switch 30 which deactivates the reader through the switch 40. The full power of unregulated electric supply is connected to the emitter of transistor 30 and passes on to the light 41, which may be red, and which is in series with the silicon controlled rectifier 42. The collector of the transistor 30 is tied to the gate of the selector 42 with a zone resistor 43 and to ground. When the signal through the card reader matches the signal being conducted through the indicia of a card being read, sufficient voltage passes through transistor 30 to activate the signal 31.

When a credit card to be read is inserted in the card reader (not shown) the switch 31 is closed and the motor 2 is activated and will continue to run until the credit card is removed. This same situation activates the full wavebridge rectifier 44, through the rectifier 45, and supplies power to one side of the switches 46, 47 which are in series with the solenoids 22, 25. The line 48 extends from the rectifier 44 to the switch 49 which is activated by the solenoid 16. When all of the cards in the bin have passed over the reader 53, the last card bears extra indicia as 51 which will activate the silicon controlled rectifier 50, closing the relay 52 which will remove switches 45, 47 from the circuit and which will excite the light 55, and switch 3 will remain in operation and the motor will continue to run until the credit card is removed.

OPERATION

An illustration of the operation of the device is where a plurality of credit cards have been issued, such as by an oil company, and a number of such cards have been determined to be bad credit risks, and the company has issued data cards, such as the usual IBM cards, to the distributors of its product, containing the identification indicia similar to that on the credit cards, having punched openings to receive control pins which are electronically in connection with a decoder and a scanner. The credit card of the customer is placed on the scanner in the usual manner and the machine is turned on, which starts the motor 2. The bin 14 contains the IBM cards bearing the numbers of the cards found to be bad risks and the solenoid 22 moves the arm 23, pushing the bottom card in the bin 14 against the shoulder 18, the first movement of the solenoid 25 will move nothing, but the second movement of the arm 23 will push another card against the shoulder 18, pressing the card thereunder beneath the shoulder 18 and the arm 26 will move the bottom card under the roller 13 where it will be propelled forwardly over the reader 53, where the pins 29 will enter the punched indicia and if the same arrangement of indicia appears on the card being scanned, sufficient current will pass through the resistor 30 to ignite the light 41. As a card is moved on to the belt 7, it will pass through the channel 6 and back into the bin 14, and as the end of the card contacts the switch 21, the solenoid 16 is activated to push the card the rest of the way into the bin 14.

On the reader 53 are the extra pins 28, adjacent the credit card indicia, which will be received by punched areas in the last of the stored cards, which will conduct a signal to deactivate the solenoids 22, 25 and which will conduct a signal to the green light 55 to indicate completion of the cycle.

When the credit card is removed from the scanner, the switch 31 will be opened and the motor will stop.

The reader requires only about one millionth of a second to conduct a signal to the scanner, consequently the speed of the operation is such that approximately four hundred cards may be scanned in some fifteen seconds. The capacity of the machine is designed to move a limited number of cards through the channel 6, for instance, no more than four cards will be in movement through the channel at any given time, consequently, the bin will remain at substantially a constant level, requiring very little pressure on the follower 15.

We claim:

1. A device for moving data cards over a reader head, comprising a storage bin, a discharge opening in said bin, a reader head in horizontal alignment with said opening, means for moving a card from said bin over said head and means for returning said card to said bin.

2. The device defined in claim 1 wherein said means for moving said card over said reader head comprises solenoid operated pushing arms in series, adapted to move a card through said passageway to a position over said reader, and a rotating belt adapted to receive said card from said reader and return same to said bin.

3. The device defined in claim 1 wherein a power roller is provided to move said card from said bin to a rotating belt, by means of which it is returned to said bin.

4. The device defined in claim 1 wherein said means for returning said card to said bin consists of a source of power for rotation of a belt, a rotating belt actuated by said source of power, said belt moving in a channel from said reader to the upper portion of said bin.

5. The device defined in claim 1 wherein said means for moving said cards over said reader head consists of means in said bin for maintaining the stored cards tightly packed, a shoulder formed adjacent the discharge opening of said bin, solenoids operating in series to move a card into position over said reader, one card being moved against said shoulder adjacent the discharge opening of said bin, and said card being moved against the card below, moving the forward end of said last mentioned card beneath said shoulder and another solenoid actuated arm moving said lowermost card through said discharge opening and beneath a rotating roller which in turn moves said card over the reader head and on to a rotating return belt.

References Cited

UNITED STATES PATENTS 2,522,226 12/1945 Hood ---------------- 271—3
3,221,431 12/1965 Stauffer -------------- 40—78

FOREIGN PATENTS 1,141,116 12/1962 Germany.

RICHARD E. AEGETER, Primary Examiner

U.S. Cl. X.R.

129—16.1